United States Patent [19]

Pedersen et al.

[11] 4,254,535

[45] Mar. 10, 1981

[54] METHOD AND AN APPARATUS FOR MAKING BASIC MATERIAL FOR THE PRODUCTION OF A BIOLOGICALLY ACTIVE PREPARATION

[75] Inventors: Ernst L. Pedersen, Tastrup; Erik Balslev, Fredensborg, both of Denmark

[73] Assignee: A/S Orthana Kemisk Fabrik, Kastrup, Denmark

[21] Appl. No.: 61,071

[22] Filed: Jul. 26, 1979

[30] Foreign Application Priority Data

Aug. 2, 1978 [DK] Denmark .............................. 3437/78
Nov. 27, 1978 [DK] Denmark .............................. 5291/78

[51] Int. Cl.³ .................... C07G 7/026; A22C 17/06; A22B 5/18
[52] U.S. Cl. ........................................ 17/45; 17/1 R; 17/43; 435/226
[58] Field of Search ..................... 435/226; 17/43, 45, 17/1 R

[56] References Cited

U.S. PATENT DOCUMENTS

| | | | |
|---|---|---|---|
| 2,305,714 | 12/1942 | Keil | 435/226 |
| 2,560,603 | 7/1951 | Selby | 17/43 |
| 2,595,638 | 5/1952 | Castelow | 17/43 |
| 2,701,228 | 2/1955 | McKerns | 435/226 |
| 2,720,678 | 10/1955 | Valentine et al. | 17/43 |
| 3,549,501 | 12/1970 | Trautman et al. | 435/226 |

FOREIGN PATENT DOCUMENTS

| | | |
|---|---|---|
| 376599 | 7/1932 | United Kingdom . |
| 410649 | 5/1934 | United Kingdom . |
| 438592 | 11/1935 | United Kingdom . |
| 745473 | 2/1956 | United Kingdom . |
| 791186 | 2/1958 | United Kingdom . |
| 900459 | 7/1962 | United Kingdom . |
| 951984 | 3/1964 | United Kingdom . |

*Primary Examiner*—Willie G. Abercrombie
*Attorney, Agent, or Firm*—Dennison, Meserole, Pollack & Scheiner

[57] ABSTRACT

A method and apparatus for making basic or starting material for the production of a biologically active preparation such as pepsin and/or mucin from stomachs of swines or hogs. The starting material is made by mechanically separating mucous cells from their supporting membrane at the fundus regions of the stomachs without substantially damaging said membrane, the mucous cells may, for example, be separated by cutting, abrading, or scraping action. The stomachs are preferably suspended at their thicker edge portions while they are treated by one or more pairs of oppositely rotating rollers having scraping edges thereon such as flexible fingers or knobs. The invention also relates to a basic material produced by the said method and substantially consisting of mucous cells separated from the membranes at the fundus region of stomachs of swines or hogs.

35 Claims, 12 Drawing Figures

METHOD AND AN APPARATUS FOR MAKING BASIC MATERIAL FOR THE PRODUCTION OF A BIOLOGICALLY ACTIVE PREPARATION

BACKGROUND OF THE INVENTION (1) Field of the Invention

The present invention relates to a method and apparatus for making a basic material for the production of a biologically active preparation, such as pepsin/or mucin, for stomachs of swines or hogs.

(2) Description of prior art

It is known to produce pepsin from a basic material gained from swine stomachs containing pepsin and/or precursors thereof (in the following called pepsin) in the mucous cells located at the so-called fundus regions of the stomachs. When the stomachs to be used for the production of the said basic material have been removed from slaughtered swines or hogs, each stomach is opened by a cut whereafter the inside is turned out and the stomach is rinsed by water. Several methods of making a basic material or starting material for the production of pepsin from such rinsed swine stomachs are known. By one of the methods presently most frequently used the mucous membrane of the fundus region is removed from the stomach by making a certain cut in the stomach wall, whereafter the total membrane is torn off. In a succeeding operation the pylorus and cardia parts of the membrane are cut off if necessary so that only the fundus membrane and the mucous cells fastened therein remain. This work may be made manually as well as mechanically. However, due to the difficulty of the work it has proved very difficult to obtain a well-trimmed product in current production in industrial scale. Thus, at the rate of operation necessary it often happens in practice that substantial parts of muscular and fatty tissue are torn off together with the fundus membrane on which the pepsin containing cells or glandular tissue are positioned. Furthermore, cutting of the pylorus and cardia parts of the mucous membrane is ofte made imperfect.

If further working of the membrane torn off from swine stomachs is to take place at another location—which is normally the case—they must be packed and frozen before shipment. At the location where the frozen fundus membranes are to be further processed they are thawed and thereafter comminuted, for example in a mincing machine or meat grinder, whereby a material having a coarse-grained forcemeat-like consistency is obtained. From the basic or starting material thus made pepsin may be produced, for example by using a method as that described in U.S. Pat. No. 2,305,714. As explained above the starting material made by the above known method will contain substantial parts of tissue being without interest for the production of pepsin, such as connective tissue and muscular tissue. The contents of pepsin in the fundus regions of stomachs from swines or hogs are different for different breeds of pigs, and may also be dependent on the age and on the feeding and other growth conditions of the swines or pigs. As the starting material made by using the above known method only has a small content of the interesting pepsin-containing glandular tissue, mucous tissue with a satisfactory yield pepsin per unit of weight of the starting material is obtained only if well-trimmed fundus membranes from swine stomachs having a relatively high content of pepsin are used. Due to the fact that the starting material or basic material produced by the known methods are also rather unlike as far as pepsin content and trimming quality are concerned, it has not been possible in practice to give adequate specifications for the starting material.

GENERAL DESCRIPTION OF THE INVENTION

The present invention provides a simple method and apparatus by means of which a more uniform and more concentrated starting or basic material for the production of pepsin, mucin, or another biologically active preparation than that obtained by the above known methods, may be produced.

Thus, the present invention provides a method of making a basic material for the production of a biologically active preparation, such as pepsin or mucin, from stomachs of swines or hogs, said method comprising turning the inside of each said stomachs out so as to expose the fundus region thereof, said fundus region including a membrane having mucous cells thereon, and mechanically separating said cells from said membrane, whereby said membrane is left on said stomach. By separating the interesting mucous cells from the membrane to which they are fastened, a starting material having a relatively high concentration of the biological preparation of interest is obtained. Furthermore, this starting material has a slimy consistency and does not require a subsequent comminuting operation like that produced by the above known methods. Due to its slimy consistency the starting material produced by the method according to the invention may easily be homogenized and mixed so that the quality thereof becomes more uniform. It also becomes easier to give specifications of the material such as the content of pepsin, or mucin. Furthermore, the slimy starting material may easily be adjusted by means of suitable additives, if desired, and may also be transported by pumping, for example in a processing system.

The method according to the invention makes it possible to select mucous tissue exactly from the regions of the stomachs where the content of the biogially active preparation of interest is high. Due to the fact that the method according to the invention makes it possible to produce a starting material having a substantially increased concentration of the interesting biologically active preparation, such as pepsin or mucin, the method according to the invention may also make it profitable to produce the desired starting material from stomachs in which the concentration of the said preparation is so small that hitherto it has not been considered sufficient for a profitable production. Compared to the known method described above the method according to the invention also has the advantage that the stomachs are not destroyed by the mechanical separation of the mucous cells. Consequently, the treated stomachs may later be used for other purposes.

The separation of the mucous cells from their supporting membrane may take place in any suitable manner such as by cutting, scraping, grinding off, or abrasion. The method of separation should, however, be chosen so that the mucous cells are separated without substantially damaging the supporting membrane.

In principle, the said stomachs having their insides turned out may be supported in any suitable manner when the mucous cells are being separated. It has been found however, that the most convenient way of supporting the stomachs is to suspend each stomach at an edge portion thereof remote from said fundus region prior to separating said mucous cells. The interesting regions of the stomach are then found at opposite sides of the lower part of the suspended stomach and are easily accessible to suitable cell separating tools or implements. The stomachs may, for example, be suspended on a tube or rail which is passed through the natural openings of each stomach. It has been found that the thickness of a stomach from a swine or hog is varying substantially, and that the thinner area is that of the fundus region, while the maximum thickness is normally found at an edge portion remote from said fundus region. Therefore, the said stomachs may, alternatively, be suspended in a manner by passing them in between a pair of parallel, spaced, elongated guide members, such as endless belts, chains, or stationary rails, said remote edge of each stomach being positioned above, and said fundus region being positioned below said guide members, the thickness of said edge exceeding the spacing of said guide members.

In principle, any cutting, scraping, or abrading tool or implement may be used for separating the mucous cells. However, experiments seem to show that a satisfactory separation of mucous cells from suspended stomachs is obtained only when the following three conditions are fulfilled:

(1) The cell separating means and the stomach suspending means should be moved relatively away from each other so as to keep the stomachs in a stretched condition during separation.

(2) Each separating tool should comprise a plurality of cutting, scraping, or abrading edges each having a relatively small extension in a direction transversely to the direction of said relative movement of the tool, and the said edges should preferably be arranged in a plurality of rows each extending in the said transverse direction, the edges of consecutive rows being arranged in staggered relationship.

(3) The tool and a cooperating backing member (preferably a pair of rollers) should be arranged on opposite sides of the stomach being treated, and said tool and/or said backing member should have a stomach-contacting surface which is sufficiently resilient to compensate for the varying thicknesses of the stomachs being treated.

In the preferred embodiment of the method according to the invention the separating tools are a pair of oppositely rotating rollers, and during separation of the mucous cells the stomachs are moved relative to said rollers through the nip therebetween. At least one and preferably both of said rollers should have a resilient cylindrical surface, and each of said cylindrical surfaces should be provided with suitable scraping, abrading, brushing, or cutting edges. The said cylindrical surface may, for example, be formed by a perforated metal plate. However, in the preferred embodiment the cylindrical working surface of each roller is provided with a plurality of small, closely spaced protrusions of a resilient material, such as rubber. These protrusions may be formed as cylindrical knobs, each having a height of the same order as its diameter.

According to one embodiment of the invention the axes of said pair of rollers are kept stationary and define acute angles with the longitudinal direction of the stomach suspending means. The rinsed stomachs having their insides turned out, may be manually arranged on said suspending means. When the rollers are rotated in opposite diections the stomachs will automatically be moved along the suspending means and through the nip between the pair of rollers. In the preferred embodiment the longituinal axes of said pair of rollers extend substantially parallel with the longitudinal direction of the suspending means, and during separation of mucous cells the suspending means and the rollers are moved relatively away from each other. The stomachs being passed to the suspending means may be moved intermittently along said suspending means into the nip between the rollers by means of suitable carrier means which may, for example, comprise endless belts, chains, or the like engaging with the upper portions of the suspended stomachs. These carrier means may also constitute the said suspending means or guide members. In order to avoid that stomachs are pulled out of engagement with the suspending means or guide members or are wedged between the latter under the influence of the frictional forces applied thereto by the rotating rollers, other parts of the stomachs adjacent to the suspended edges thereof may be kept stationary in relation to the guide members while said mucous cells are being separated from their supporting membrane. The clamping means which may also be used as carrier means for moving the stomachs along their suspending means, may comprise a pair of rails or strips, which may be pressed together by suitable mechanical means or by means of pneumatic or hydraulic cylinders. If the said clamping means are used for clamping the thicker stomach parts extending upwardly from the guide members, the said clamping may reduce the thickness of these thicker stomach parts which may have the adverse effect that the stomachs may fall down between the guide members when the clamping means have been released. Therefore, the clamping means are preferably cooperating with the stomach parts positioned immediately below the said guide members.

The present invention also provides an apparatus for separating mucous cells from membranes on stomachs from swines or hogs, said apparatus comprising suspending means for suspending each of said stomachs at an edge portion thereof, and mechanical means for separating said cells from their supporting membrane on the stomachs suspended by the said suspending means with their insides out. The said suspending means may, for example, comprise a tube or rail which may be passed through the natural openings of the stomachs. However, in the preferred embodiments of the apparatus the said suspending means comprise a pair of parallel, elongated guide members mutually spaced a distance exceeding the thickness of the thinner main position of each of said stomachs, and being smaller than a thicker edge portion of said stomach.

The invention also relates to a basic or starting material for the production of a biologically active preparation, such as pepsin or mucin, substantially consisting of mucous cells separated from membranes at the fundus region of stomachs from swines or hogs.

BRIEF DESCRIPTION OF THE DRAWINGS

The invention will now be further described with reference to the drawings, wherein.

DESCRIPTION OF EMBODIMENTS

Figure 1:
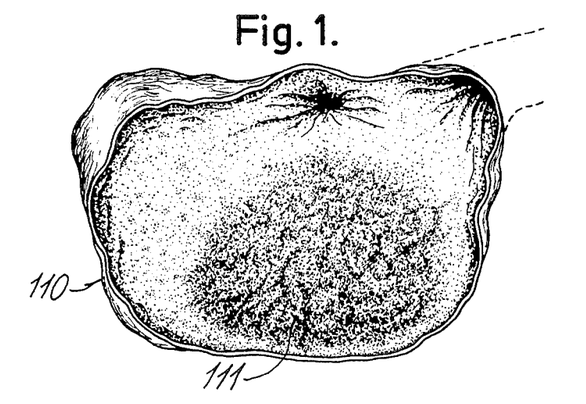
FIG. 1 is a stomach from a swine or hog, wherein a wall part thereof has been cut away.

FIG. 1 shows a stomach 110 having a fundus region 111 clearly distinguishable from the other regions of the inner walls of the stomach. In the fundus region the mucous cells have the form of glandular tissue 112 containing pepsin, mucin, or precursors thereof. The glandular tissue 112 is fastened to a basement membrane 113 separating the glandular tissue 112 from the outer layers 114 of muscular and fatty tissue, see FIG. 2.

Figure 2:
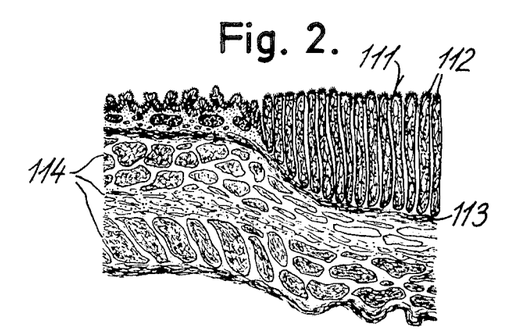
FIG. 2 is a section of a wall part of the stomach shown in an enlarged scale.

By the known methods normally used the mucous membrane comprising i.a. the mucous cells 112 and the membrane 113 is torn off as a whole, whereafter the fundus membrane is trimmed by cutting off the pylorus and cardia parts of the membrane, if necessary. After removal of the mucous membrane from the stomach 110 the muscular and fatty tissue remain on the stomach. However, in practice substantial parts of the tissue layers 114 are often torn off together with the membrane 113, and the undesired pylorus and cardia parts of the membrane are quite often not cut off. According to the method of the present invention the mucous cells 112 are separated from the fundus region of the stomach in such a manner that the membrane 113 remains substantially intact and fastened to the underlying tissue layers 114. Furthermore, only the mucous cells of the fundus region are separated from the membrane.

Figures 3, 5, 6:
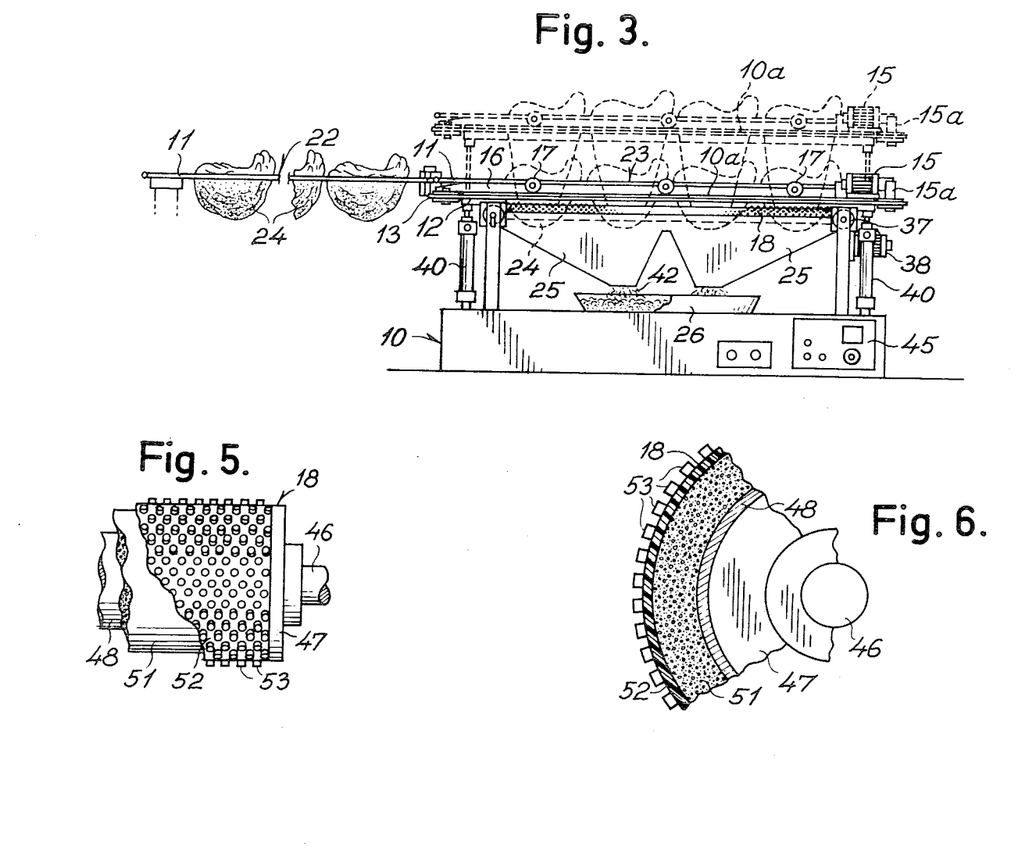
FIG. 3 is a side view of a preferred embodiment of the apparatus according to the invention.
FIG. 5 is a side view of one end of a preferred embodiment of a separating roller to be used in the apparatus according to the invention.
FIG. 6 is a partially sectional view of the roller shown in FIG. 5 in an enlarged scale.
Figure 4:
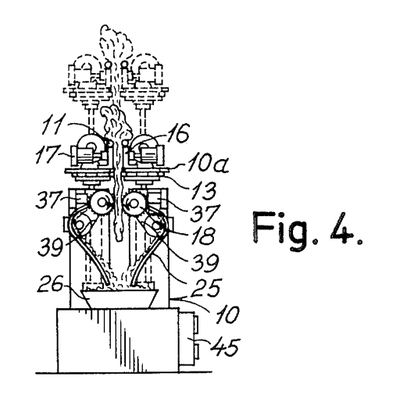
FIG. 4 is an end view of the apparatus shown in FIG. 3.

FIGS. 3 and 4 show a preferred embodiment of an apparatus for separating mucous cells 112 from their basement membrane of stomachs from swines or hogs in accordance with the methods of the present invention. The apparatus has a frame 10 comprising a vertically movable frame part 10a carrying a part of parallel, mutually spaced guide rails 11, and carrier means formed as two parallel extending endless belts 12 arranged immediately below the guide rails 11 so that the spacing of the adjacent runs of the belts substantially corresponds to the spacing of the guide rails. The belts 12 are passed around pulleys 13 rotatably mounted on the movable frame part 10a. The endless belts 12 may be driven by an electric motor 15 through a gearing 15a. A pair of parallel, mutually spaced clamping rails 16 movable toward and away from each other by means of hydraulic or pneumatic cylinders 17, are mounted on the movable frame part 10a between the guide rails 11 and the belts 12.

A pair of rotatable stomach engaging rollers 18 which will be further described below, is mounted on the stationary part of the frame 10. Pneumatic or hydraulic cylinders 37 are adapted to move the rollers 18 between a first position in which the rollers are widely spaced, and a second position in which said rollers are positioned closely adjafent to each other. An electric motor 38 may rotate the rollers 18 in opposite direction through a power transmitting device 39, such as a belt drive.

As shown in FIG. 3, the apparatus is divided into a loading station 22 in which the guide rails 11 are stationary, and a processing station 23 in which the frame part 10a may be moved vertically by means of pneumatic or hydraulic cylinders 40 between a first position shown in solid lines and a second position shown in dotted lines in FIG. 3. Stomachs 24 having been rinsed and having their insides turned out so that mucous cells are positioned on the outside thereof, are manually inserted between the guide rails 11 at the loading station 22 in such a manner that the thinner parts comprising the fundus region of the stomachs extend below the guide rails and the belts 12 while a thicker portion of the stomachs extend upwardly from the guide rails as shown in FIGS. 3 and 4. When a suitable number of stomachs 24, such as four or more, has been placed between the guide rails 11 at the loading station 22, and the movable frame part 10a is in its lower position shown in solid lines in FIG. 3, the stomachs 24 are moved from the loading station 22 into the processing station 23. The movement may be caused by suitable carrier means (not shown) arranged at the loading station, such as the belts 12 which may extend into the loading station 22.

The operator may actuate the apparatus causing the cylinders 17 and 32 to move the clamping rails 16 and the rollers 18, respectively, into close engagement with opposite sides of the stomachs 24 positioned at the processing station 23. Thereafter, the cylinders 40 are extended so as to move the movable frame part 10a and the clamped stomachs depending therefrom upwardly while the rollers 18 are rotated in opposite directions by the motor as indicated by arrows in FIG. 4. Thereby, the rollers 18 will perform a scraping or abrading action on the parts of the stomachs 24 depending downwardly below the belts 12. This action causes that mucous cells are separated from the fundus regions of the stomachs which are simultaneously being stretched as indicated in dotted lines in FIG. 3. The mucous mass 42 being separated from the stomachs may be removed from the rollers 18 by means of suitable scrapers (not shown) and passed to a collecting container 26 by means of funnel-like guiding structures 25 arranged below the rollers.

When the movable frame part 10a has reached its upper position the clamping rails 16 and the rollers 18 are moved to their widely spaced positions, whereafter the frame part 10a may be moved to its lower position by means of the cylinders 40. Simultaneously, the motor 38 is started so that the belts 12 will move the threaded stomachs 24 out from the apparatus and down into a collecting container 43 via a chute 44. Thereafter a further number of stomachs 24 may be passed from the loading station 22 into the processing station 23. The operation of the apparatus described and the mutual function of the various parts of the apparatus may be controlled by a suitable electrical control unit of known type. The apparatus also contains a control panel 45 having various adjusting members for adjusting the various functions to their optimal values.

FIGS. 5 and 6 show a preferred embodiment of the rollers 18 to be used in the apparatus according to the invention. The roller shown in FIGS. 5 and 6 has a shaft 46 and end walls 47 mounted thereon. The roller 18 also has a cylindrical wall 48 of a stiff material, such as metal. This cylindrical wall 48 is superposed by a layer 51 of a relatively soft material, such as rubber, foamed rubber or foamed plastic. The cylindrical surface of roller 18 is covered by an outer layer 52 of a resilient material, such as natural or artificial rubber. The outer layer 52 has a plurality of flexible fingers or knobs 53 formed thereon, the said knobs being arranged in longitudinally extending rows and the knobs in adjacent rows being arranged in staggered relationship as shown in FIG. 5. The fingers or knobs 53 are formed as short cylinders performing a scraping or abrasive action on the stomachs 24 when the rollers 18 are rotated and are in engagement with the stomachs 24. The rollers 18 should be sufficiently resilient to compensate for the varying thicknesses of the stomachs 24 so that all parts of the stomachs coming into contact with the rollers 18 will be exposed to substantially the same roller action despite their varying thicknesses.

Figures 7, 8, 9:
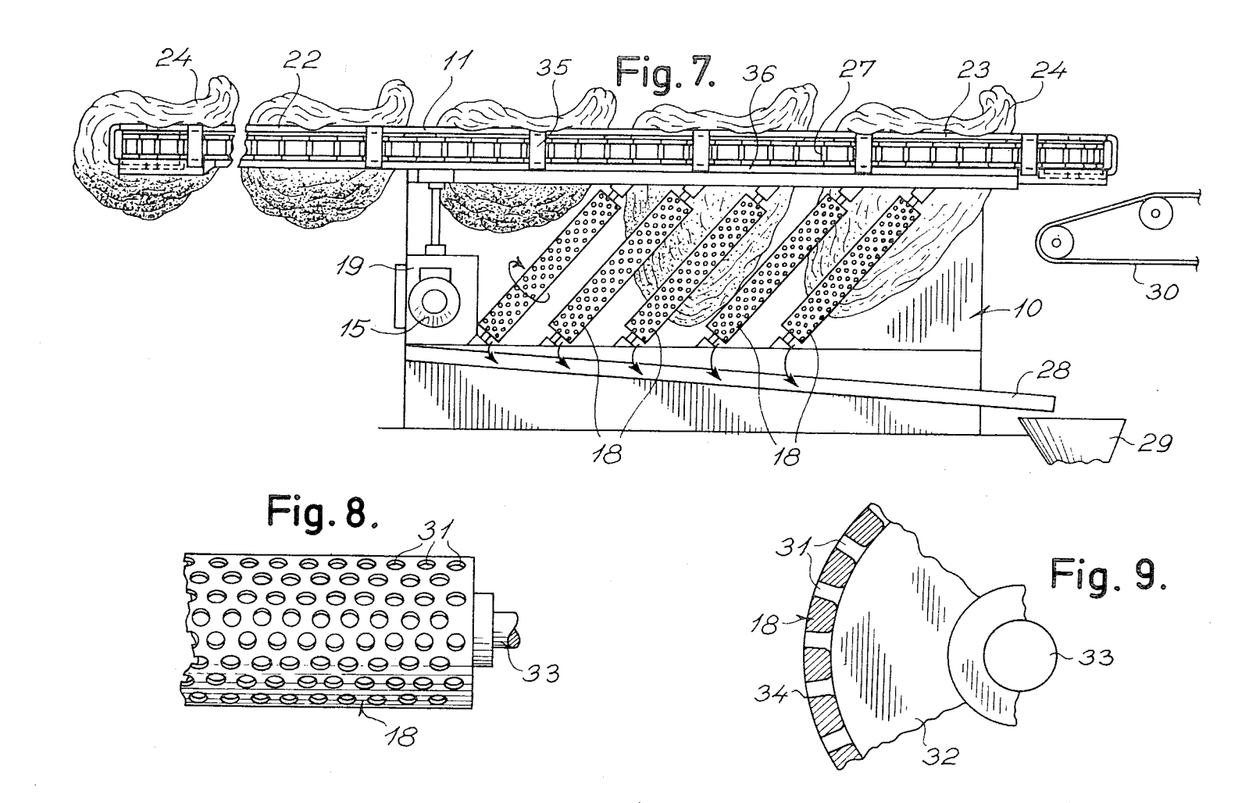
FIG. 7 is a side view of a second embodiment of the apparatus according to the invention.
FIG. 8 is a partial side view of an other embodiment of a roller to be used in the apparatus according to the invention
FIG. 9 is a partially sectional view of the roller according to FIG. 8 shown in an enlarged scale.

In the embodiment shown in FIG. 7 the parts corresponding to those shown in FIGS. 3 and 4 are designated by the same reference numerals. In the embodiment of FIG. 7 the frame 10 has no moveable parts, and the guide rails 11 are fixed in relation to the frame. The endless belts 12 and the clamping rails 16 of the embodiment shown in FIGS. 3 and 4 have been replaced by endless chains 27 having their adjacent runs arranged immediately below the guide rails 11. The chains 27 may be guided by a number of relatively closely spaced sprockets (not shown), rotatably arranged between the guide rails 11 and a rail 36 positioned below each of the guide rails by means of connecting parts 35. The chains 27 are continuously driven by the motor 15 and may be provided with projections or tappets (not shown). When a stomach is introduced between the guide rails 11 and the chains 27 the adjacent runs of the latter will engage with the stomach and move it along the rails 11. Pairs of rollers 18 defining acute angles with the guide rails 11 are rotatably mounted about the stationary axes. Each pair of these rollers are also continuously rotated in opposite directions by the motor 15. When a stomach 24 is passed into the nip between a pair of rollers 18 they will not only separate mucous cells from their supporting membrane of the stomach, but also tend to move the stomach along the guide rails 11 in the desired direction (to the right as viewed i FIG. 7). Separated mucous cells having the consistency of a viscous mucous mass may pass into a hollow inner space of the rollers through perforations therein. The separated mass may then flow from the lower end of the rollers 18 into a collecting channel 28 from which the mass may be emptied into a collecting container 29. The processed stomachs 24 having been considerably stretched by the action of the rollers 18, are moved from the guide rails 11 on to a conveyor belt 30 for transporting the processed stomachs to a desired location.

FIGS. 8 and 9 show another embodiment of the roller 18 having a cylindrical wall made from metal plate, such as stainless steel, and provided with a plurality of openings or perforations 31. The perforated cylindrical wall is mounted on end walls 32 fastened to a shaft 33. The best scraping action of the roller 18 shown in FIGS. 8 and 9 is obtained when the outer edges 34 of the perforations 31 are relatively sharp. The perforations are preferably made by punching, and the sharper edge is normally obtained at the side of the metal plate where punching tool has been moved out from the metal plate. Therefore, this side of the plate is normally chosen as the outer surface of the roller.

As explained above, the cylindrical surface of at least one of the rollers 18 in a pair of rollers should preferably be made from a resilient material. Therefore, even though rollers of the type shown in FIGS. 8 and 9 may be used, it is more preferred to use rollers of the type shown in FIGS. 5 and 6.

Figure 10:
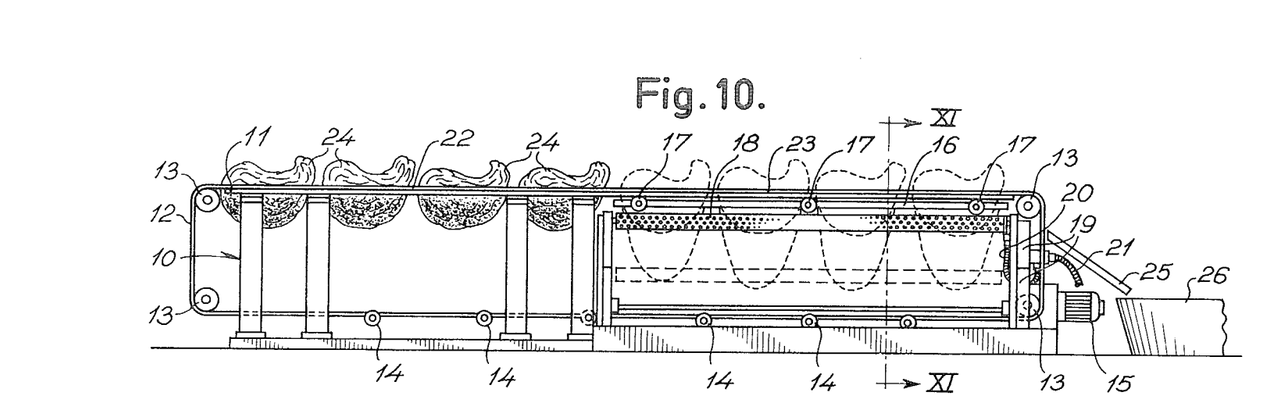
FIG. 10 is a side view of a third embodiment of the apparatus according to the invention.
Figure 11:
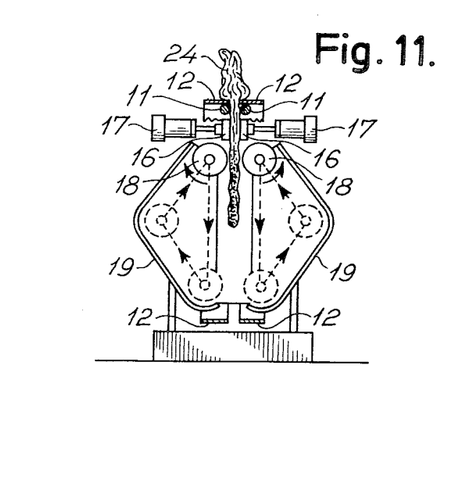
FIG. 11 is a sectional view along the line XI—XI in FIG. 10.

Also in the embodiment shown in FIGS. 10 and 11 the frame 10 has no movable parts. Each of the endless belts 12 is arranged in a substantially vertical plane, and the upper runs of the belts are arranged immediately above the guide rails 11. The lower runs of each of the belts may be passed over tensioning rolls 14 shown in FIG. 10. The pair of parallel rollers 18 which may be rotated in opposite directions as indicated by arrows in FIG. 11 may be moved from the upper starting positions shown in solid lines in FIG. 11 along triangular paths indicated by dotted lines. The rotational movement as well as the translatory movement along the said triangular path may be generated by suitable force transmitting and guiding means 19 which may be driven by the electric motor 15 or one or more separate motors (not shown). When the rollers 18 are of the type shown in FIGS. 8 and 9, each of the rollers may be provided with a flexible tube or hose 20 connected to a common suction hose 21 which may be communicating with a suitable suction source (not shown).

The operation of the apparatus shown in FIGS. 10 and 11 is as follows:

When a suitable number of stomachs 24 has been suspended between the guide rails 11 at the loading station 22, the operator actuates the driving means moving the belts 12 so that the said stomachs 24 are moved from the loading station 22 along the guide rails 11 into the processing station 23. The rollers 18 are now moved to their upper starting position shown in solid lines in FIGS. 10 and 11. in which the rollers are pressed into contact with the stomachs 24 located at the processing section 23. At the same time the cylinders 17 are actuated so that the clamping rails 26 are pressed against the parts of the stomachs located immediately below the guide rails 11. The rollers are now moved vertically downwardly along the lower part of the stomachs 24 and are simultaneously rotated in opposite directions as indicated by arrows in FIG. 11. During this downward movement the rollers will separate the mucous cells from the stomachs. When the rollers 18 have reached their lower positions the clamping rails 16 are moved to their retracted positions by means of the cylinders 17 so as to release the stomachs 24 at the processing station 23, and while the rollers are returned to their upper starting positions the belts 12 are driven so that a further number of stomachs 24 which has veen manually inserted between the guiding rails at the loading station 22, are moved into the processing station. Simultaneously, the processed stomachs are moved out from the apparatus and into the collecting container 26 via the chute 25.

Figure 12:
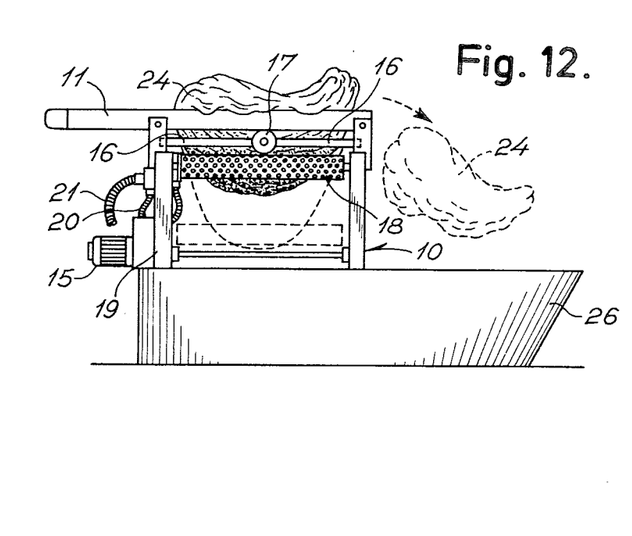
FIG. 12 is a side view of a fourth embodiment of the apparatus according to the invention.

The embodiment shown in FIG. 12 is adapted to process only one stomach 24 at the time. However, the function and structure of the apparatus correspond in principle to the structure and the function of the apparatus of FIGS. 10 and 11 and corresponding parts of the two embodiments are designated by the same references numerals. A stomach 24 to be processed in the apparatus shown in FIG. 12 is manually inserted between the guide rails 11 and between the rollers 18. Thereafter the clamping rails 16 and the rollers 18 may be actuated as previously described, and when the stomach 24 has been treated by the rollers it may be manually removed and replaced by another stomach to be treated.

The apparatus shown in FIG. 12 may, alternatively, be adapted for automatically discharging the stomach 24 after processing of the same. Such automatic discharge may, for example, be performed by clamping rails 16 which may be adapted to be moved in the longitudinal direction in relation to the guide rails 11 (to the right in FIG. 12) when processing of the stomach has been terminated, whereby the processed stomach may be moved out from the space between the guide rails 11 and then released. In such a modified apparatus the operator only has to place the stomachs to be treated between the guide rails 11 manually and successively, and, if desired, the apparatus may be adapted to automatically start its operation when a stomach has been placed between the guide rails The period of time in which a stomach is processed in the apparatus may be used by the operator for preparing another stomach to be treated, i.e. for cutting, turning the inside out, and rinsing the same. The suction hoses 20 and 21 may be omitted, and the separated mucous mass may then be guided into a container, or packing 26 arranged immediately below the rollers 18.

EXAMPLE

A number of stomachs from swines or hogs were treated in an apparatus corresponding to that shown in FIGS. 3 and 4 provided with a pair of rollers 18 of the type shown in FIGS. 5 and 6. The diameter of each roller 18 was about 50 mm, and the rollers were rotated with a peripheral speed of 40 m per minute. The diameter of each of the cylindrical fingers or knobs 53 on the peripheral surface of the rollers 18 was about 1.3 mm, and the radial height of each finger or knob was about 1 mm. The spacing between the fingers or knobs in each longitudinal row as well as the peripheral spacing between two consecutive rows were about 1.3 mm. Four stomachs 24 were processed at the same time, and each roller 18 was pressed against the stomachs with a pressure of about 152 kgs. The movable frame part 10a was moved upwardly with such a speed that the stomachs were in contact with the rollers 18 in a period of time of about 30 seconds. After this treatment almost all of the mucous cells were separated from their supporting membranes at the fundus regions of the stomachs, and these fundus membranes were completely intact and showed a white color.

It should be understood, that various amendments of the embodiments shown in the drawings may be made within the scope of the present invention. As an example, the rollers 18 in the embodiment shown in FIGS. 7 and 10-12 may be replaced by rollers of the type shown in FIGS. 5 and 6. Furthermore, the rollers 18 in the embodiment shown in FIGS. 10-12 may be rotatable about fixed axes, and the relative translatory movement between the rollers and the guide rails 11 and the clamping rails 16 may be obtained by moving these rails in the manner described in connection with the embodiment shown in FIGS. 3 and 4. It is also possible to omit the guide rails 11 and possibly also the carrier means 12. In the latter case the clamping rails 16 may be movable in their longitudinal direction from the loading station 22 into the processing station 23.

I claim:

1. A method of making a basic material for the production of a biologically active preparation from stomachs of swine, said method comprising:
   turning the inside of each said stomachs out so as to expose the fundus region thereof, said fundus region including a membrane having mucous cells thereof, and
   mechanically separating said cells from said membrane, whereby said membrane is left on said stomach.

2. A method according to claim 1, wherein said biologically active preparation is selected from the group consisting of pepsin and mucin.

3. A method according to claim 2, wherein said separation of cells is made by abrasion.

4. A method according to claim 2, wherein said separation of cells is made by scraping.

5. A method according to claim 2, wherein each of said stomachs having its inside turned out is suspended at an edge portion remote from said fundus region prior to separating said mucous cells.

6. A method according to claim 5, wherein said mucous cells are separated by means of at least one rotatable first roller having a cylindrical working surface, said first roller and a backing member defining a backing surface thereof being positioned on either side of said stomach so as to contact said surfaces therewith, said roller and said suspended edge portion of the stomach being moved relatively away from each other while said roller is in contact with said stomach, said roller being rotated in such a direction that the part of its working surface contacting said stomach is moving away from said suspended edge portion.

7. A method according to claim 6, wherein at least one of said surfaces is defined by resilient material.

8. A method according to claim 7, wherein said backing member is a second roller, and said backing surface is a cylindrical working surface thereon, said first and second rollers being rotated in opposite directions and arranged as a pair of rollers having the stomach positioned in the nip therebetween.

9. A method according to claim 8, wherein said working surface of said roller is provided with a plurality of small closely spaced protrusions of a resilient material.

10. A method according to claim 9, wherein said protrusions are made from rubber.

11. A method according to claim 10, wherein said protrusions are cylindrical knobs, each having a height of the same order as its diameter.

12. A method according to claim 4, wherein said working surfaces of the roller is formed by a plate defining a plurality of closely spaced perforations therein.

13. A method according to claim 6, wherein said stomachs having their insides turned out are passed in between a pair of parallel, spaced, elongted guide members, said remote edge portion of each stomach being positioned above, and said fundus region being positioned below said guide members the thickness of said edge portion exceeding the spacing of said guide members.

14. A method according to claim 13, wherein the axes of said pair of rollers are stationary and define acute angles with said guide members, the stomachs being moved along said guide members, when said rollers are rotated.

15. A method according to claim 13, wherein said relative movement between said suspended edge portion of the stomach and said pair of rollers is generated by moving said guide members upwardly and retaining the axes of said rollers stationary.

16. A method according to claim 15, wherein parts of said stomach adjacent to said suspended edge portion is clamped and kept stationary in relation to said guide members, while said cells are being separated.

17. An apparatus for separating mucous cells from membranes on stomachs from swine, said apparatus comprising
suspending means for suspending each of said stomachs at an edge portion thereof, and
mechanical means for separating said cells from their supporting membranes on the stomachs suspended by said suspending means with their insides turned out.

18. An apparatus according to claim 17, wherein said suspending means comprise a pair of parallel, elongated guide members mutually spaced a distance exceeding the thickness of a thinner main portion of each of said stomachs and being smaller than a thicker edge portion of said stomach.

19. An apparatus according to claim 18, wherein said mechanical means comprise at least one pair of rotatable rollers mounted below said guide members on opposite sides of a plane extending through the space defined between said guide members.

20. An apparatus according to claim 19, further comprising first moving means for moving said guide members and said rollers in relation to each other along said plane between an extended first position and a retracted second position, second moving means for moving said pair of rollers in opposite directions towards said plane in said retracted second position, and in opposite directions away from said plane in said first extended position of said guide members and said rollers, and third moving means for rotating said rollers in opposite directions when said guide members and said rollers are moved from said second to said first relative position 21. An apparatus according to claim 20, wherein the axes of said pair of rollers extend substantially parallel to said guide members.

22. An apparatus according to claim 19, wherein said rollers are rotatable about stationary axes defining acute angles with said guide members.

23. An apparatus according to claim 21, further comprising means for intermittently moving said suspended stomachs along said guide members, while said rollers are moved away from said plane.

24. An apparatus according to claim 23, further comprising clamping means for clamping parts of said stomachs adjacent to said guide members.

25. An apparatus according to claim 24, wherein said intermittent moving means comprise said clamping means being intermittently movable along said guide members in their clamping condition.

26. An apparatus according to claim 20, wherein the cylindrical surface of at least one of said pair of rollers are made from a resilient material.

27. An apparatus according to claim 26, wherein the cylindrical surface of at least one of said pair of rollers is provided with a plurality of small, closely spaced protrusions of a resilient material.

28. An apparatus according to claim 27, wherein said protrusions are arranged in rows extending longitudinally of said roller, the protrusions in adjacent rows being arranged in staggered relationship.

29. An apparatus according to claim 28, wherein said protrusions are made from rubber.

30. An apparatus according to claim 29, wherein said protrusions are cylindrical fingers or knobs, each having a height of the same order as its diameter.

31. An apparatus according to claim 26, wherein the cylindrical surface of at least one of said rollers is formed by a plate having a plurality of closely spaced perforations therein.

32. An apparatus according to claim 18, wherein said guide members are formed as movable endless belts.

33. An apparatus according to claim 18, wherein said guide members are a pair of spaced rails.

34. A basic material for the production of a biological active prepraration substantially consisting of mucous cells said cells being separated from membranes at the fundus region of stomachs from swine while leaving said membranes substantially intact with the stomach.

35. A material according to claim 34, wherein said preparation is selected from the group consisting of pepsin, and mucin.

* * * * *